United States Patent [19]

Ferment et al.

[11] Patent Number: 6,143,445
[45] Date of Patent: Nov. 7, 2000

[54] COMPOSITE ELECTRODES CONTAINING CHOPPED CONDUCTIVE FIBERS

[76] Inventors: George R. Ferment; Joseph B. Kejha, both of c/o Lithium Technology Corp., Plymouth Meeting, Pa. 19462-1129

[21] Appl. No.: 09/131,217

[22] Filed: Aug. 7, 1998

[51] Int. Cl.⁷ .................................................. H01M 4/24
[52] U.S. Cl. ...................................... 429/218.1; 429/231.8
[58] Field of Search ................................. 429/231.8, 218.1

[56] References Cited

U.S. PATENT DOCUMENTS 5,677,084  10/1997  Tsukamoto et al. ..................... 429/218
5,776,633  7/1998  Mrotek et al. .......................... 429/218

*Primary Examiner*—Maria Nuzzolillo
*Assistant Examiner*—Monique Wills
*Attorney, Agent, or Firm*—Zachary T. Wobensmith, III

[57] ABSTRACT

Composite electrodes which are used in electrochemical devices, such as alkali-metal polymer electrolyte electrochemical devices, contain chopped metallized fibers in an electrode slurry which has been cured and then pressed onto a metal base, or which is coated directly onto the base prior to curing.

1 Claim, 1 Drawing Sheet

COMPOSITE ELECTRODES CONTAINING CHOPPED CONDUCTIVE FIBERS

BACKGROUND OF THE INVENTION

1. Field of the Invention

This invention is directed to electrodes for alkali metal based electrochemical devices that contain electrically conductive fibers, which may have been metallized, chopped into short lengths and mixed with other components to form the electrodes.

2. Description of the Prior Art

Electrochemical devices such as electric batteries of the solid state type consist of at least an anode, a layer of electrolyte, and a cathode. Batteries require a base current collector and carrier for both the anode and the cathode, which is in contact with an electrode. Various materials have been proposed for use in the electrodes, such as metal foil, powdered metal, mats of woven or non-woven fabric, but none of them are entirely satisfactory.

In Japanese Patent NO. 55-39180 (A) a method of production for the electrode base of a cell is described. A porous member such as felt or non-woven cloth of polypropylene, or polyethylene is immersed in a binder solution that contains conductive powder such as nickel, iron, or carbon powder. The porous member is dried, and electrolytic galvanization with nickel is performed to obtain a nickel layer on the member. The whole Japanese patent structure including powder is metallized after coating.

In the U.S. Patent to Drews et al., U.S. Pat. No. 5,139,902, an electrode is described which comprises a grid plate, which serves as the carrier for battery active material and for current supply and return. The grid plate includes woven plastic threads which are rendered electrically conductive by coating with a conductive layer of metal, and additionally metallized by coating with at least one coating of a lead-tin alloy or lead alone.

Examples of other prior art structures are shown and described in the U.S. Pat. No. to Balanger, U.S. Pat. No. 3,485,677; Rippel, et al., U.S. Pat. No. 4,275,130; Basu, U.S. Pat. No. 4,304,825; Bannister, U.S. Pat. No. 4,471,37; Suguichi, et al., U.S. Pat. No. 4,496,638; Murray, U.S. Pat. No. 4,497,883; Skotheim, U.S. Pat. No. 4,529,086; Hope, et al., U.S. Pat. No. 5,350,647; U.S. Pat. No 4,576,883; Kejha U.S. Pat. No. 5,750,289; Alamgir, et al., U.S. Pat. No 5,747,195 and in the article by Hooper, et al. titled "Advanced Battery Development" published by Odense University Press, 1984.

The described electrochemical devices for which composite electrodes are described and for which the present electrodes are useful include alkali metal batteries, lithium-ion batteries, capacitors and fuel cells.

SUMMARY OF THE INVENTION

It has now been found that the use of electrically conductive chopped and preferably metallized fibers in electrodes for alkali metal based electrochemical devices provides a strong lightweight composite structure, with a long shelf and operating life, increased electrical conductivity, and which is suitable for mass production and provides numerous other benefits.

The principal object of the invention is to provide composite electrodes for alkali metal based electrochemical devices which are strong, lightweight, and which increase electrical conductivity.

A further object of the invention is to provide composite electrodes for alkali metal based electrochemical devices which are useful with a wide variety of devices.

A further object of the invention is to provide composite electrodes for alkali metal based electrochemical devices which can be formed separately, or coated directly onto a current collector.

A further object of the invention is to provide composite electrodes for alkali metal based electrochemical devices that lend themselves to mass production.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structures disclosed without departing from the spirit of the invention.

Like numbers refer to like parts throughout the several views.

DESCRIPTION OF THE PREFERRED EMBODIMENTS

When referring to the preferred embodiments, certain terminology will be utilzed for the sake of clarity. Use of such terminology is intended to encompass not only the described embodiment, but also technical equivalents which operate and function in substantially the same way to bring about the same result.

Figure 1:
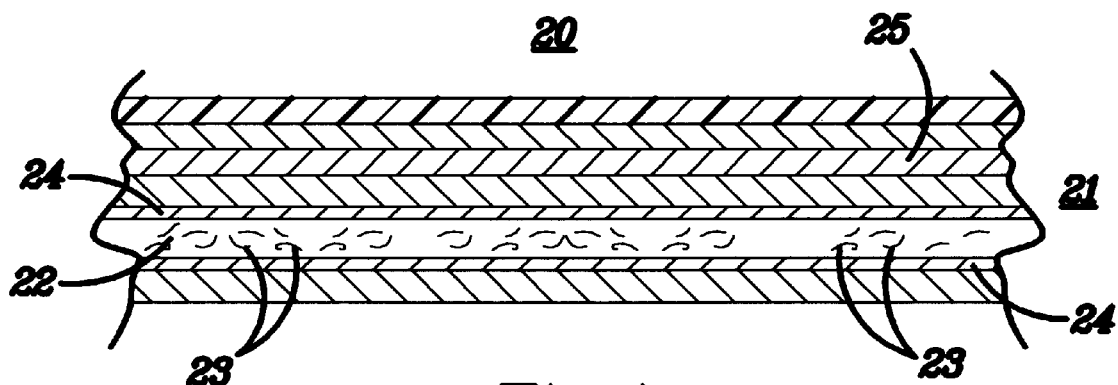
FIG. 1 is a diagrammatic view of one embodiment of a battery incorporating the composite electrode in accordance with the invention.

Referring now more particularly to the drawings and FIG. 1 thereof, a typical alkali metal-polymer battery 20 is illustrated which incorporates the electrode of the invention.

Alkali metal-polymer batteries such as alkali metal or alkaline earth metal-polymer batteries, and for example lithium-ion polymer batteries, consist of at least an anode or negative electrode, a polymer ion-conductive layer, and a cathode or positive electrode. Such batteries can be of virtually any desired size and configuration, and usually include additional layers such as current conducting backing layers, insulating layers and connection layers. In batteries with liquid electrolytes, the polymer layer is replaced by a porous membrane with liquid electrolyte.

For purposes of illustration, the battery 20 to be described is of the lithium type, but other alkali metals or alkaline earth metals can be used if desired. The battery 20 includes a base 21 which acts as a current collector and carrier of the electrode.

To the base 21, as illustrated, is added a layer 22 of composite electrode material.

The composite electrode active material contains electro-conductive fibers 23, which may be plain carbon fibers, or carbon fibers, plastic fibers, or other fibers, which have been metallized in any well known manner such as by spraying, sputtering, vacuum deposition, dip coating, electroplating, or electroless metal plating. The metal coating may be of any suitable material such as copper, nickel, aluminum, or other materials selected to be compatible with the components of the battery or device.

The fibers after coating with metal are chopped into small pieces, and then mixed into an electrode slurry, which includes an active material, a carbon powder and a binder, and may include a solvent.

The electrode slurry may also contain liquid polymer electrolyte.

The slurry is preferably coated onto a release tape (not shown) and solidified by well known means, depending on its composition, such as cooling, radiation, or heat cross-linking. The resultant layer 22 has the release tape peeled off and can then be pressed onto a metal foil or grid 21 which is a current collector and carrier, to form an electrode assembly.

If desired, the slurry may be coated directly onto a current collector 21 such as metal foil, or grid, or fibrous net or other current collector layer.

The presence of the chopped metallized fibers markedly improves the electrical conductivity of the electrode structure, and they may also touch the current collector which also improves the electrical conductivity of the electrode. The second electrode 25 may be also similarly constructed.

If the base current collector and carrier 21 is to be used for a cathode, then it may be coated by a layer 21 of cathodic composition of well known type, which may have finely ground particles of an intercalation compound such as vanadium oxide compound $V_6O_{13}$ or a lithiated oxide mixed with an organic solvent, a polymer, an alkali metal salt, and carbon black.

Additional layers may be applied to form the complete device. The layer 22 may have a layer 24 of polymeric electrolyte applied thereto which may be a thin layer of polyethylene oxide or polyvinyldiene fluoride compounded with a lithium salt, an approtic liquid, and the anodic electrode layer 25 may be added on top of the electrolyte. The anode 25 may be of lithium, li-alloy or of a carbon compound and may have a current collector 26.

Figure 2:
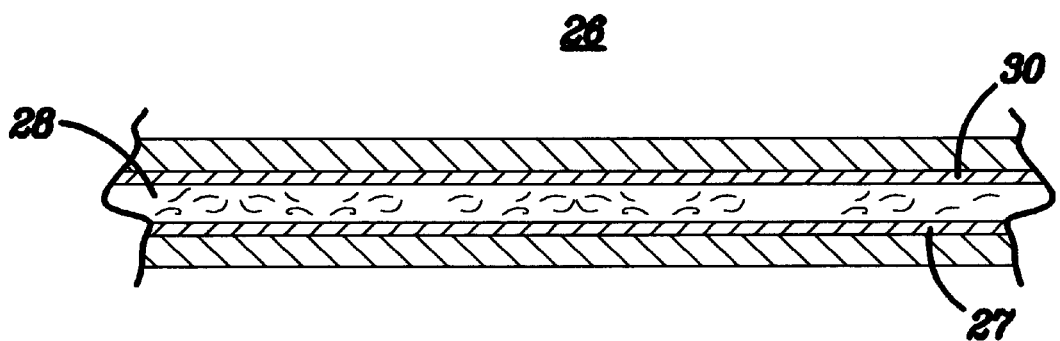
FIG. 2 is a diagrammatic view of another electrode assembly of the invention having the current collector embedded therein.

Referring to FIG. 2 a composite electrode 27 is illustrated which includes a current collector 28 embedded in a layer of composite electrode material 29, which is constructed of chopped electroconductive fibers and an active material as described for FIG. 1.

For other types of batteries, appropriate chemistry layers may be applied on the described current collectors/carriers.

It will thus be seen that structures have been provided with which the objects of the invention are achieved.

We claim:

1. Composite electrodes for use in an alkali metal based electrochemical device, which said device includes a negative electrode, a polymer ion conductive layer, and a positive electrode, wherein at least one of said electrodes consists of a current collector and composite electrode material which includes an active material, a carbon powder, a binder and chopped up electrically conductive metallized fibers, which may be in contact with a length of current collector, and in which said fibers are of metallized plastic.

* * * * *

UNITED STATES PATENT AND TRADEMARK OFFICE
CERTIFICATE OF CORRECTION

PATENT NO. : 6,143,445
DATED : November 7, 2000
INVENTOR(S) : George R. Ferment and Joseph B. Kejha It is certified that error appears in the above-identified patent and that said Letters Patent is hereby corrected as shown below:

Abstract,
Line 3, insert --which electrodes-- after "chemical devices,".

Column 3,
Line 25, after the word "layer", delete "21".

Column 4,
Line 5, replace "approtic" with -- aprotic --.
Line 7, replace "li" with -- Li --.

In the Drawings,
In Figure 1 of the issued patent, references numbers 22, 24 and 25 indicate the wrong structures, reference number 21 was incorrectly positioned, and reference number 26 is missing in its entirety. These errors are corrected in the following replacement drawing:

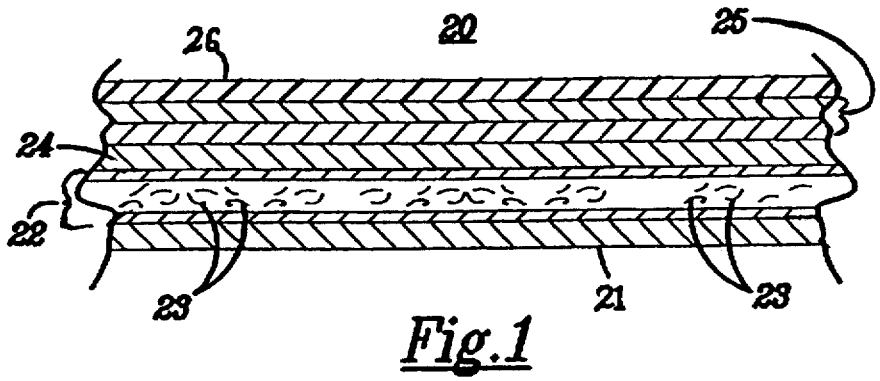

Fig.1

UNITED STATES PATENT AND TRADEMARK OFFICE
CERTIFICATE OF CORRECTION

PATENT NO. : 6,143,445
DATED : November 7, 2000
INVENTOR(S) : George R. Ferment and Joseph B. Kejha It is certified that error appears in the above-identified patent and that said Letters Patent is hereby corrected as shown below:

In the Drawings,
In Figure 2 of the issued patent, reference numbers 27 and 28 indicate the wrong structures, and reference numbers 26 and 30 are incorrectly assigned. Reference number 29 was absent. These errors are corrected in the following replacement drawing:

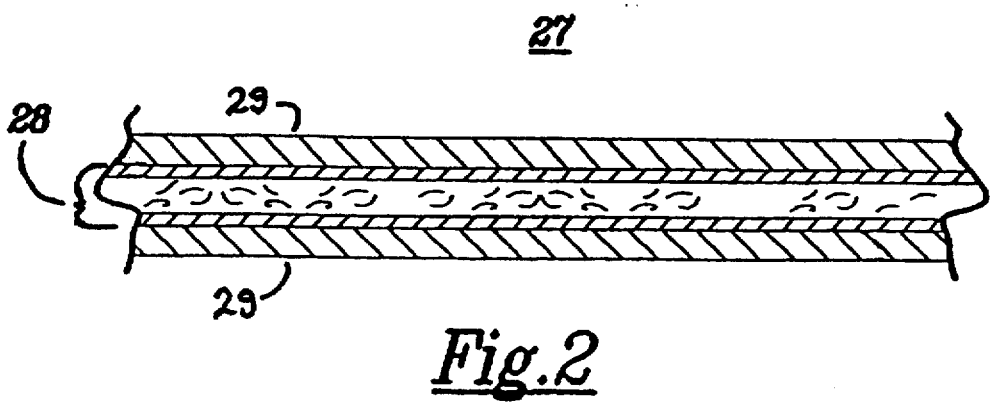

*Fig.2*

Signed and Sealed this

Sixteenth Day of October, 2001

Attest:

NICHOLAS P. GODICI
*Attesting Officer*       *Acting Director of the United States Patent and Trademark Office*